July 25, 1961 P. C. HUTTON 2,993,715

FLEXIBLE MOUNTINGS FOR PIVOTAL JOINTS

Filed May 5, 1958 2 Sheets-Sheet 1

INVENTOR
PHILIP C. HUTTON

BY
Holcombe, Wetherill & Brisebois
ATTORNEYS

FLEXIBLE MOUNTINGS FOR PIVOTAL JOINTS

Filed May 5, 1958 2 Sheets-Sheet 2

INVENTOR
PHILIP C. HUTTON
BY
Holcombe, Wetherill & Brisebois
ATTORNEYS

United States Patent Office 2,993,715

Patented July 25, 1961

2,993,715

FLEXIBLE MOUNTINGS FOR PIVOTAL JOINTS

Philip Charles Hutton, Crawley, England, assignor to Silentbloc Limited, Crawley, England, a British company Filed May 5, 1958, Ser. No. 733,186
Claims priority, application Great Britain May 8, 1957
7 Claims. (Cl. 287—85)

This invention relates to pivotal joints of the kind including a rubber bushing and relates particularly, but not exclusively, to such pivotal joints intended for use in a vehicle suspension system.

According to the present invention a flexible mounting comprises an inner externally cylindrical member of relatively rigid material and an outer sleeve of flexible resilient material surrounding it and gripping it by reason of circumferential tension and having an external circumferential surface which is approximately cylindrical over all parts of its length, wherein the outer circumferential surface of the sleeve in its undistorted state is cylindrical over the major portion of its length but has a flared portion at at least one end, at which end the inner circumferential surface is of correspondingly tapered form such that after assembly of the sleeve on the inner member by stretching, such externally tapered portion of the outer circumferential surface is approximately cylindrical. According to one embodiment the flared portion is in the form of a flange which is preferably displaced when the sleeve is stretched over the inner member so that it lies finally in a plane normal to the axis of the sleeve.

In an alternative arrangement the sleeve has a flared portion at each end, one of which is in the form of a flange and the other of which is so dimensioned that when it is stretched over the inner member its external diameter does not exceed that of the major cylindrical portion of the sleeve.

According to a further aspect of the invention a flexible mounting comprises an inner externally cylindrical member of relatively rigid material and an outer sleeve of flexible resilient material the inner circumferential surface of which in its free state has a length and an internal diameter respectively greater and less than the length and external diameter of the inner member, the sleeve having in its free state flared portions at each end of its bore and the dimensions of both the inner member and sleeve being such that when the sleeve is stretched onto the inner member the outer circumferential surface of the sleeve is cylindrical over at least the major intermediate part of its length whilst the external diameter of its end portions does not exceed that of the cylindrical intermediate part. Conveniently, the external diameter of the end portions after assembly is the same as the major intermediate part of its length.

The invention may be carried into practice in a number of ways but four specific embodiments will now be described by way of example with reference to the accompanying drawings in which.

In the embodiments of the invention to be described the joints are employed as oscillating joints for example as the pivotal connections of springs and spring shackles in vehicle suspension systems.

Figure 1:
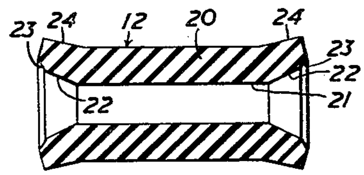
FIGURE 1 is a section of a rubber sleeve or bushing according to one embodiment of the invention.
Figure 2:
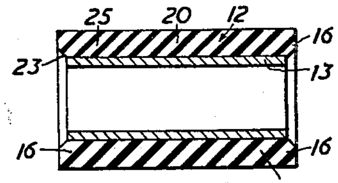
FIGURE 2 is a section of the bushing of FIGURE 1 after it has been stretched over an inner sleeve.
Figure 3:
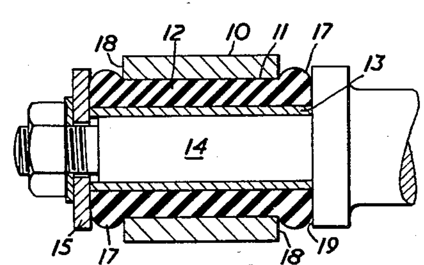
FIGURE 3 is a section of the embodiment of FIGURES 1 and 2 after it has been assembled within an outer member.

The joint according to the embodiment of FIGURES 1 to 3 comprises an outer member 10 (shown in FIGURE 3), for instance the eye of a vehicle spring, having a cylindrical bore 11 therein into which is inserted a rubber sleeve or bushing 12. The bushing is shown in its free state in FIGURE 1. This is stretched onto a rigid tubular cylindrical inner member 13 as shown in FIGURE 2. The inner member 13 is of a length somewhat shorter than the rubber bushing 12 but somewhat longer than the length of the outer member 10 so that the outer end portions 16 of the rubber bushing project beyond the adjacent end of the inner member which in turn projects somewhat beyond the adjacent end of the bore of the outer member.

The assembly of the joint of this embodiment comprises stretching the rubber bushing upon its inner member as shown in FIGURE 2 and inserting it within the bore of the outer member 10 shown in FIGURE 3. A clamping bolt 14 is passed through the inner member 13 which affords a shoulder 19 which engages one end of the rubber bushing 12. The bolt carries a washer 15 at its outer end and as the bolt is tightened, the shoulder 19 and washer 15 are drawn into engagement with the outer ends of the cylindrical inner member 13. In being so drawn together the shoulder 19 and washer 15 compress the parts 16 of the rubber bushing which initially extended beyond the ends of the inner member as shown in FIGURE 2 thus causing these end portions to expand radially and form in effect flanges 17 which, in the assembled joint, lie between the end faces 18 of the outer member lying immediately around the outer ends of the bore therein and the opposed faces of the shoulder 19 and the washer 15.

The form of the rubber bushing 12 in its free state before stretching over the cylindrical inner member 13 is clearly shown in FIGURE 1. The bushing of rubber has a main cylindrical portion 20 having a cylindrical bore 21 therein which is of a diameter approximately half that of the cylindrical inner member 13. The length of the cylindrical part of the bore 21 of the rubber bushing is slightly less than the length of the cylindrical inner sleeve 13. This inner cylindrical surface of the bushing merges at each end into flared portions 22 of outwardly increasing diameter at an angle of approximately 30° to the axis of the bushing. At the extreme ends of the bushing each of these flared portions merges into a very short steeply flared portion 23 which in the assembled bushing overhangs the inner member in the manner shown in FIGURE 2.

At its ends the outer central cylindrical portion gradually increases in diameter so that it flares outwards at 24 at an angle slightly less than the internal flare 22 so that overall the ends of the bushing are of gradually reducing thickness but at the same time are flared outwards so that the overall diameter of the bushing in these regions is greater than the central cylindrical portion 20.

As has been mentioned, in order to assemble the bushing on its inner rigid sleeve 13 it is radially stretched so that its bore 21 exceeds the diameter of the sleeve which is then inserted into the bushing. The sleeve is then allowed to contract onto the inner sleeve. Accordingly it will be appreciated that in the cylindrical region 20 of the bushing the material is maintained radially stretched by the inner sleeve but by virtue of the undercut or flared ends 22 of the bore the end portions 16 and the parts 25 immediately over the ends of the inner member are not stretched to nearly such a great extent and the stresses in the material in these regions are such that these end portions 25, which in the relaxed state are flared outwards at 22 and 24, in the stretched state of FIGURE 2 lie on their internal surface in contact with the inner sleeve 13 and on the outer surface are drawn inwards to be of a cylindrical form continuous with the main central cylindrical portion 20 of the outer bushing. Accordingly in the stretched form of FIGURE 2 the initial state of the bushing is not apparent but appears to be merely a cylindrical outer bushing from end to end having small overlapping undercut portions 16 at each end.

When such a bushing is inserted into the outer member 10, the bore 11 of which has an internal diameter very slightly less than the external diameter of the rubber bushing already stretched over the inner sleeve, the material of the bushing is placed under slight compression and will therefore tend to move outwards along the axis so that the overlapping portions of the bushing at each end are enlarged. By virtue of the fact that these portions of the bushing were originally undercut or flared at 22 and 24 and therefore are not subject to the stretching like the rest of the bushing the extended overlapping portions will not tend to overlap radially inwards over the end of the inner sleeve to any great extent but will remain substantially in line with the rest of the stretched rubber bushing. Accordingly when the bolt 14 is clamped up these overlapping portions will be forced radially outwards to form the annular flanges 17 between the thrust faces and the spring eye.

Figure 4:
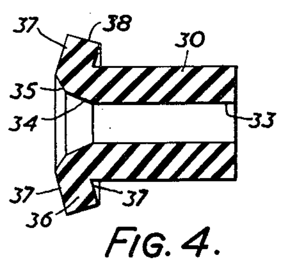
FIGURES 4, 5 and 6 are views similar to FIGURES 1, 2 and 3 of a second embodiment.
Figure 5:
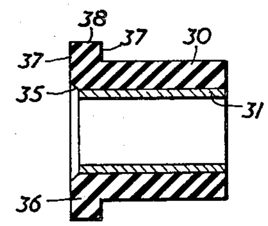
Figure 6:
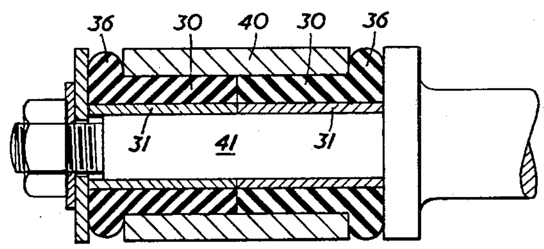

In a second embodiment of the invention shown in FIGURES 4 to 6 the form of the sleeve is such that it has a major portion 30 of cylindrical inner and outer form which at its right hand end is not provided with a flared portion but remains cylindrical and is arranged, as shown in FIGURE 5, to terminate in line with the end of the inner rigid member 31 when stretched thereon.

At the other, left hand, end of the sleeve its bore 33 is flared outwards at 34 in a similar manner to the first embodiment and again merges into a very short steeply flared portion 35 which in the assembled bushing overhangs the end of the inner member as shown in FIGURE 5. The outer surface of the sleeve is formed with an annular flange 36 the sides 37 of which in its undistorted state of FIGURE 4 are inclined toward the major cylindrical part 30 of the sleeve and the outer circumference 38 of which is also inclined at approximately 30° to the axis of the bushing so as to form a similar flare as in the first embodiment but displaced outwards on the circumference of the flange.

As in the first embodiment, the sleeve is assembled on the inner rigid member 31 by stretching it so that its bore is large enough to receive the inner member, after which it is contracted to grip the inner member. As has been mentioned, the form of the right hand end of the sleeve is cylindrical and remains so in the assembled bushing. The flanged left hand end of the sleeve, in being stretched over the inner member, is displaced as shown in FIGURE 5 so that it finally lies in a plane generally normal to the axis of the completed bushing with its sides 37 parallel and normal to this axis and its circumferential portion 38 parallel to this axis, i.e. of cylindrical form.

FIGURE 6 shows an application of a pair of bushings of the type shown in FIGURES 4 and 5 assembled in a spring eye 40 with the cylindrical, unflared ends opposing one another and the flanged ends clamped up by a bolt 41. It will be appreciated that in this embodiment the flanges in the completed joint are larger than those of the first embodiment which for certain applications is desirable.

Figure 7:
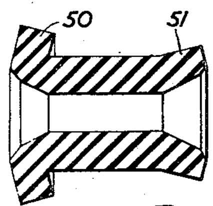
FIGURES 7 and 8 are views similar to FIGURES 1 and 2 of a third embodiment.
Figure 8:
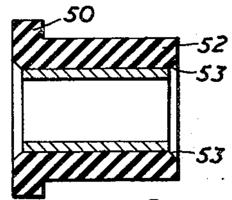
Figure 9:
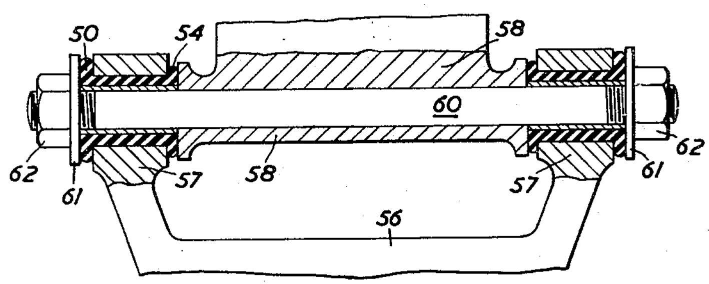
FIGURE 9 is a view of a hinge joint employed in the independent suspension of a motor car embodying a pair of the bushings shown in FIGURES 7 and 8, and FIGURES 10, 11 and 12 are views similar to FIGURES 1 to 3 of a fourth embodiment.

In the third embodiment shown in FIGURES 7, 8 and 9 a bushing is formed, the rubber sleeve of which in its free state combines the two features of the first two embodiments, that is, its left hand end is provided with a flared flange 50 whilst the other end is provided with a flared portion 51 which in the stetched bushing of FIGURE 8 ends up with an outer diameter the same as that of the major cylindrical portion of the bushing but with an overhanging portion 52 undercut at 53.

FIGURE 9 illustrates the application of a pair of the bushings of FIGURES 7 and 8 to a suspension system having a wishbone 56 affording a pair of axially spaced end sleeves 57. The co-operating part of the frame of the vehicle affords a central sleeve 58 between the end sleeves 57. A bolt 60 passes coaxially through the three sleeves and has a tight fit in the central sleeve 58 but is spaced from the end sleeves 57. Accommodated in each of these end spaces is a bushing of the type shown in FIGURE 8. The bolt 60 has a washer 61 and nut 62 at each end. When these are clamped up to the position shown in FIGURE 9 the outer flanged ends 50 of the bushing are compressed to form large flanges between the washer 61 and the end faces of the sleeves 57, whilst the overhanging portions 52 are compressed so that they also form flanges 54 between the inner and outer sleeves 57 and 58.

Figure 10:
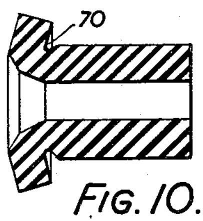
Figure 11:
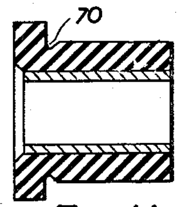
Figure 12:
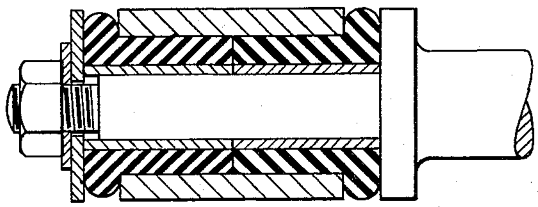

FIGURES 10 to 12 show a bushing similar to that of FIGURES 4 to 6 but in this case a groove 70 is provided in the outer circumference of the sleeve in its free state where the cylindrical portion meets the flange. This ensures that, after compression of the completed bushing within a rigid outer member as in FIGURE 12 the flange will not be distorted to any great extent by the compression of the cylindrical part of the bushing. It also ensures that there is no high degree of tension in the material of the sleeve at the root of the flange.

What I claim as my invention and desire to secure by Letters Patent is:

1. A flexible mounting comprising an inner externally cylindrical member of relatively rigid material and an outer sleeve of flexible resilient material surrounding it and gripping it by reason of circumferential tension, wherein the outer circumferential surface of the sleeve in its undistorted state is cylindrical over the major portion of its length but has an outwardly flared portion in the form of a flange at at least one end, at which end the inner circumferential surface of the sleeve is of correspondingly tapered form such that after assembly of the sleeve on the inner member by stretching, such externally tapered portion of the outer circumferential surface is approximately cylindrical, that portion of the inner surface of said flared flange which lies between the ends of said rigid member being displaced when the sleeve is stretched over the inner cylindrical member so that the flange lies finally in a plane normal to the axis of the sleeve.

2. A flexible mounting as claimed in claim 1 having a flared portion at each end one of which portions is in the form of an outwardly flanged end and the other of which is so dimensioned that when it is stretched over the inner member its external diameter does not exceed that of the major cylindrical portion of the sleeve.

3. A flexible mounting comprising an inner externally cylindrical member of relatively rigid material and an outer sleeve of flexible resilient material, the inner circumferential surface of which in its free state has a length and an internal diameter respectively greater and less than the length and external diameter of the inner member, the sleeve having in its free state outwardly flared portions at each end of its bore and the dimensions of both the inner member and sleeve being such that when the sleeve is stretched onto the inner member the outer circumferential surface of the sleeve is cylindrical over at least the major intermediate part of its length, whilst the external diameter of its end portions does not exceed that of the cylindrical intermediate part.

4. A flexible mounting comprising an inner externally cylindrical member of relatively rigid material and a longer outer sleeve of flexible resilient material which, when free from stress, comprises a main portion, the circumferential surface of which has an internal diameter less than the external diameter of the inner member, and at least one end portion having outwardly flaring inner and outer surfaces which, when said sleeve is stretched onto said cylindrical member, extends beyond one end thereof with its outer surface in axial alignment with that of said main portion, but deforms radially outward when said main portion is compressed radially inward and said sleeve is axially compressed.

5. A flexible mounting of the type comprising an inner tubular member of relatively rigid material, a longer outer sleeve of flexible material encircling said rigid tubular member, axially separable shoulder means in alignment with said sleeve at the opposite ends of said rigid tubular member, and means extending through said tubular member for connecting said shoulder means and drawing them together to axially compress said resilient sleeve, said mounting being characterized by the fact that said sleeve, when free from stress, comprises a main cylindrical portion the internal diameter of which is less than the external diameter of said inner tubular member, and at least one end portion having outwardly flaring inner and outer surfaces, said end portion, when said sleeve is stretched onto said tubular member but free from axial stress, extending beyond one end of said tubular member with its outer surface in alignment with that of its main cylindrical portion, but radially expanding in an outward direction only when axially compressed by said shoulders.

6. A flexible mounting as claimed in claim 5 in which the inner surface of said sleeve flares outwardly at an angle of approximately 30° to the axis of the sleeve.

7. A flexible mounting as claimed in claim 5 in which the inner surface of said flared portion flares out more sharply at its tip than elsewhere, and only this tip extends beyond the inner tubular member when said outer sleeve is stretched onto it, with only the inner surface of said tip still flaring outwardly.

References Cited in the file of this patent

UNITED STATES PATENTS

| | | |
|---|---|---|
| 1,913,513 | Rossman et al. | June 13, 1933 |
| 2,103,729 | Leighton | Dec. 28, 1937 |
| 2,422,327 | Winslow | June 17, 1947 |
| 2,467,548 | Bradley | Apr. 19, 1949 |
| 2,659,619 | Kishline et al. | Nov. 17, 1953 |
| 2,787,486 | Thirty | Apr. 2, 1957 |
| 2,797,929 | Herbenar | July 2, 1957 |
| 2,866,058 | Hebenstreit | Dec. 23, 1958 |
| 2,880,991 | Ward | Apr. 7, 1959 |

FOREIGN PATENTS

| | | |
|---|---|---|
| 671,811 | Great Britain | May 14, 1952 |
| 810,996 | Germany | Aug. 16, 1951 |
| 944,459 | France | Nov. 2, 1948 |
| 1,122,183 | France | May 14, 1956 |